US012620669B2

(12) United States Patent
Kim et al.

(10) Patent No.: US 12,620,669 B2
(45) Date of Patent: May 5, 2026

(54) BATTERY MODULE AND BATTERY PACK INCLUDING THE SAME

(71) Applicant: LG Energy Solution, Ltd., Seoul (KR)

(72) Inventors: Young In Kim, Daejeon (KR); Gi Hwan Kwon, Daejeon (KR); Jaehyun Bae, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 680 days.

(21) Appl. No.: 17/790,294

(22) PCT Filed: May 11, 2021

(86) PCT No.: PCT/KR2021/005905
§ 371 (c)(1),
(2) Date: Jun. 30, 2022

(87) PCT Pub. No.: WO2021/235762
PCT Pub. Date: Nov. 25, 2021

(65) Prior Publication Data
US 2023/0045763 A1 Feb. 9, 2023

(30) Foreign Application Priority Data

May 20, 2020 (KR) ........................ 10-2020-0060514

(51) Int. Cl.
*H01M 10/04* (2006.01)
*H01M 50/209* (2021.01)
(Continued)

(52) U.S. Cl.
CPC ..... *H01M 50/291* (2021.01); *H01M 10/0486* (2013.01); *H01M 50/209* (2021.01);
(Continued)

(58) Field of Classification Search
CPC ........... H01M 50/20–211; H01M 50/218–224; H01M 50/233–251; H01M 50/258;
(Continued)

(56) References Cited

U.S. PATENT DOCUMENTS

| | | |
|---|---|---|
| 2015/0004469 A1 | 1/2015 | Park et al. |
| 2017/0141367 A1 | 5/2017 | Kim et al. |

(Continued)

FOREIGN PATENT DOCUMENTS

| | | |
|---|---|---|
| CN | 205508916 U | 8/2016 |
| CN | 207909951 U | 9/2018 |

(Continued)

OTHER PUBLICATIONS

Machine translation of Chen et al., CN 205508916. Originally available Aug. 24, 2016. (Year: 2016).*

(Continued)

*Primary Examiner* — Nicole M. Buie-Hatcher
*Assistant Examiner* — Jacob Buchanan
(74) *Attorney, Agent, or Firm* — Lerner David LLP

(57) ABSTRACT

A battery module according to embodiments of the present disclosure includes: a battery cell stack in which a plurality of battery cells are stacked, a module frame that is formed into a bowl type of a bottom surface and front, rear, left and right surfaces and houses the battery cell stack; and an upper plate that covers the upper side of the battery cell stack and is coupled to the module frame, wherein the module frame comprises a bottom part, front and rear plates, and left and right plates, wherein the bottom part, the front and rear plates, and the left and right plates are integrally formed, and wherein a recessed part is formed at a portion where a bottom edge connected to the front and rear plates meet with a bottom edge connected to the left and right plates.

9 Claims, 9 Drawing Sheets

(51) Int. Cl.

| | |
|---|---|
| *H01M 50/211* | (2021.01) |
| *H01M 50/244* | (2021.01) |
| *H01M 50/258* | (2021.01) |
| *H01M 50/291* | (2021.01) |

(52) U.S. Cl.
CPC ....... *H01M 50/244* (2021.01); *H01M 50/258* (2021.01); *H01M 50/211* (2021.01)

(58) Field of Classification Search
CPC ......... H01M 50/271–276; H01M 50/289–291; H01M 10/0486
See application file for complete search history.

(56) References Cited

U.S. PATENT DOCUMENTS

| | | | |
|---|---|---|---|
| 2018/0233790 A1 | 8/2018 | Son | |
| 2019/0006647 A1 | 1/2019 | Ryu et al. | |
| 2021/0305546 A1* | 9/2021 | Chang ................. | H01M 50/204 |

FOREIGN PATENT DOCUMENTS

| | | | | | |
|---|---|---|---|---|---|
| CN | 209515783 U | | 10/2019 | | |
| CN | 110854334 A | * | 2/2020 | .......... | H01M 50/502 |
| JP | 2013133044 A | | 7/2013 | | |
| KR | 101478704 B1 | | 1/2015 | | |
| KR | 20150001604 A | | 1/2015 | | |
| KR | 20150042463 A | * | 4/2015 | ........... | H01M 10/04 |
| KR | 20170056973 A | | 5/2017 | | |
| KR | 20170107798 A | | 9/2017 | | |
| KR | 20180018109 A | | 2/2018 | | |
| KR | 101888298 B1 | | 8/2018 | | |
| KR | 102065098 B1 | | 1/2020 | | |
| KR | 20200075688 A | | 6/2020 | | |

OTHER PUBLICATIONS

Machine translation of KR 2015-0042463. Originally available Apr. 21, 2015. (Year: 2015).*
Machine translation of He, CN-110854334-A. Originally available Feb. 28, 2020. (Year: 2020).*
International Search Report for Application No. PCT/KR2021/005905 mailed Aug. 31, 2021, pp. 1-3.

* cited by examiner

【FIG. 1】
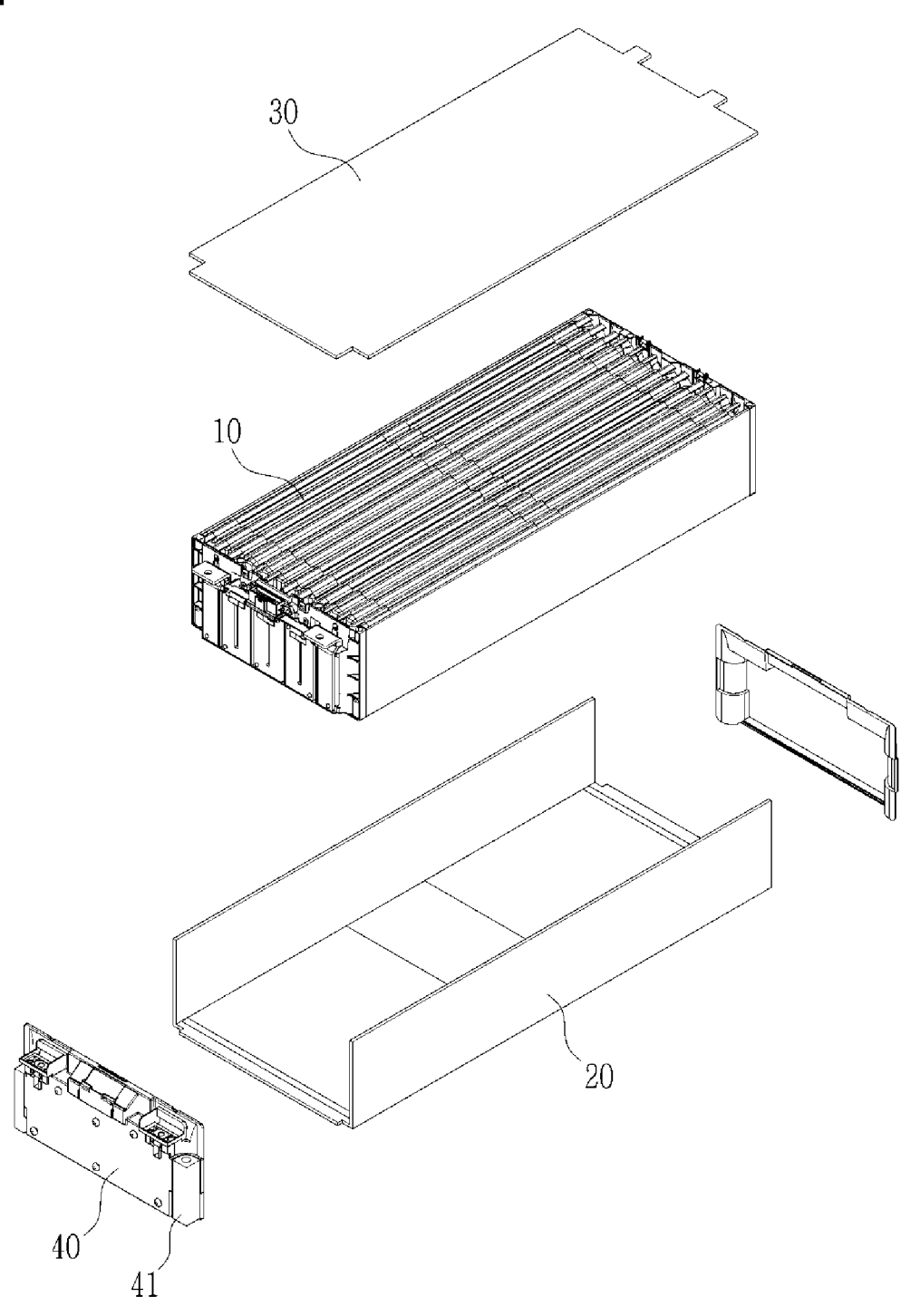

【FIG. 2】
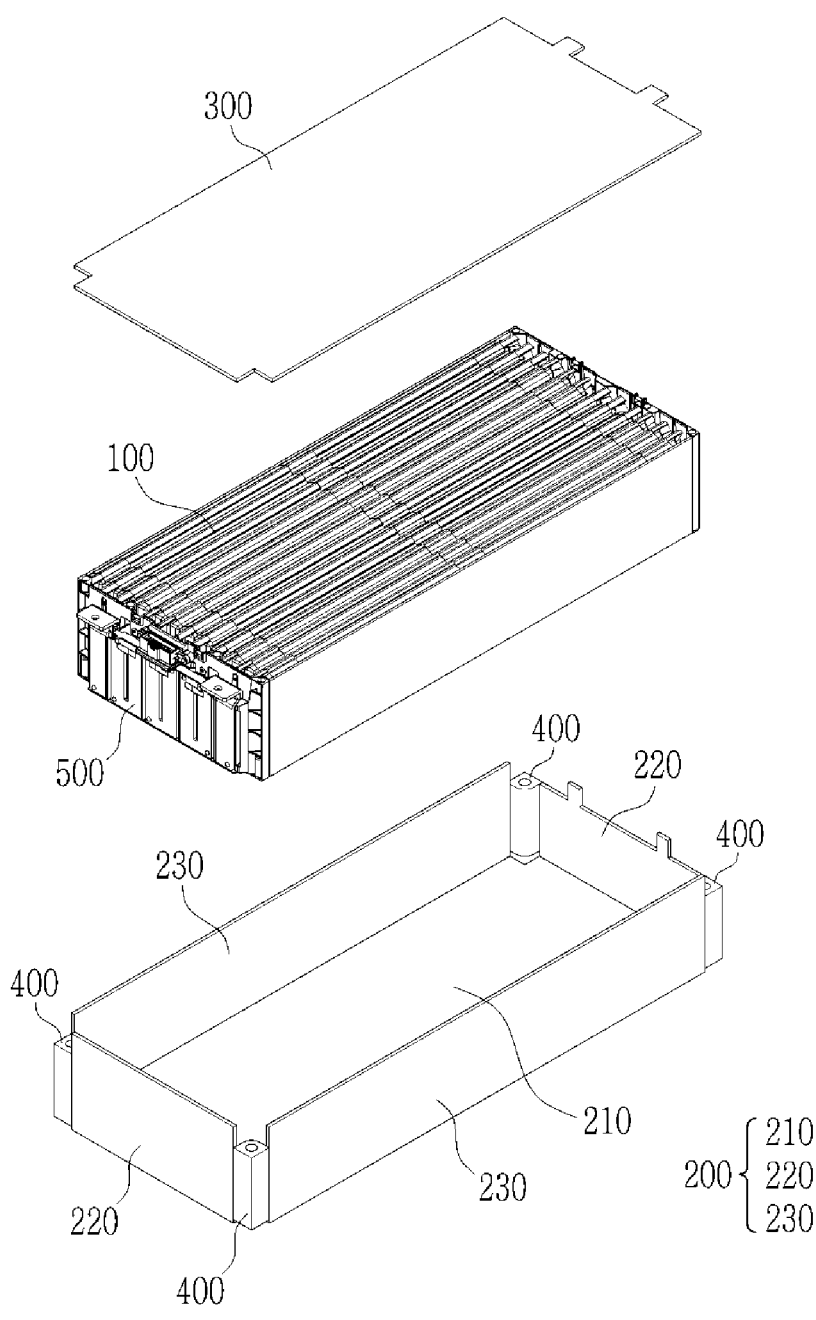

【FIG. 3】
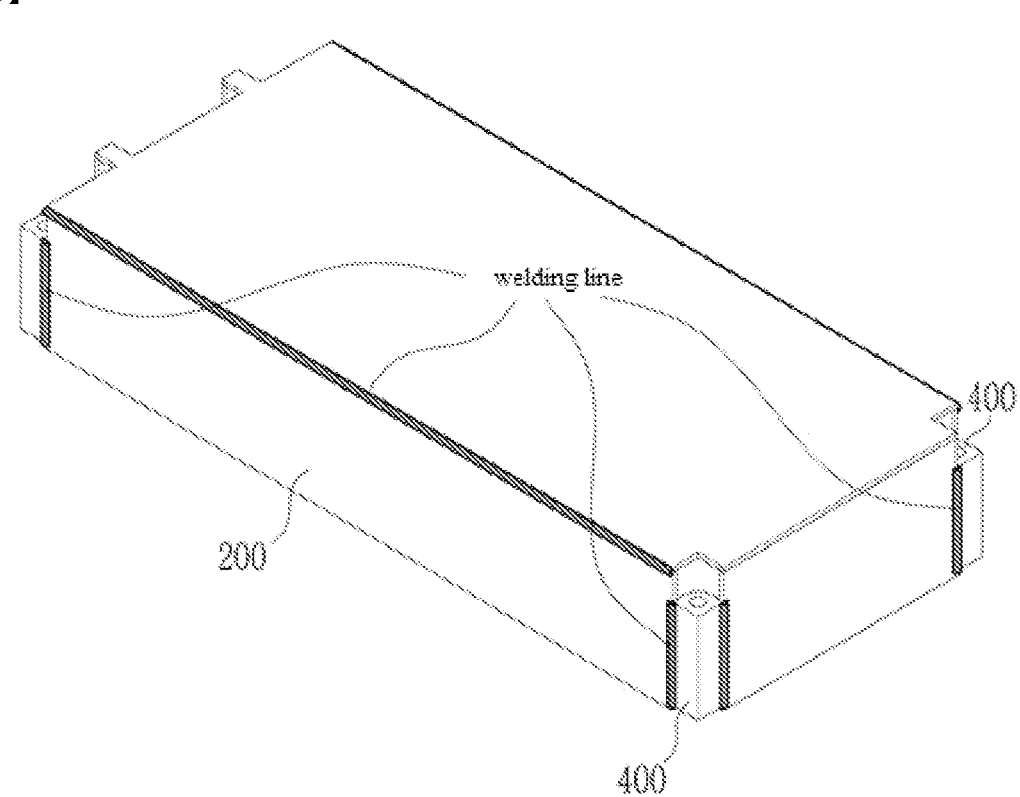

【FIG. 4】
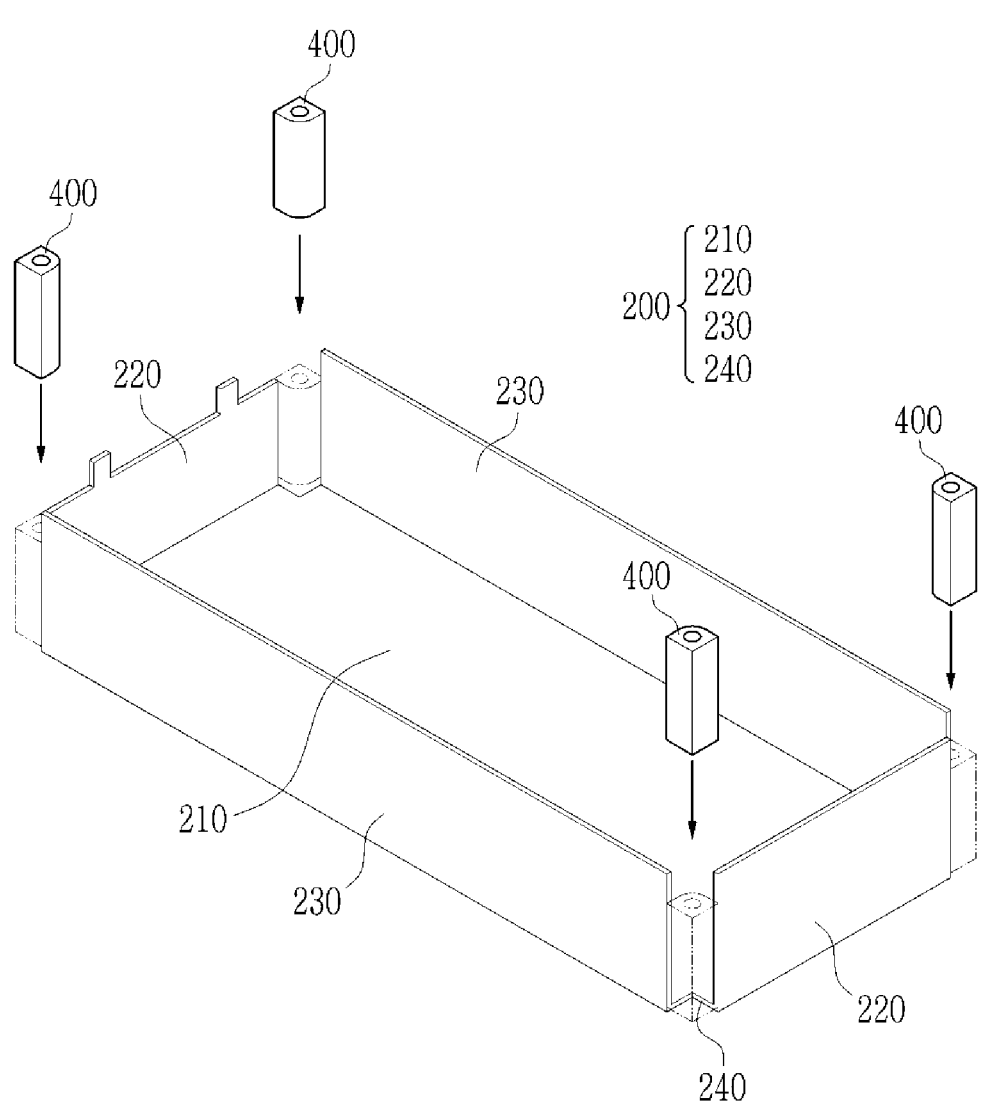

【FIG. 5】
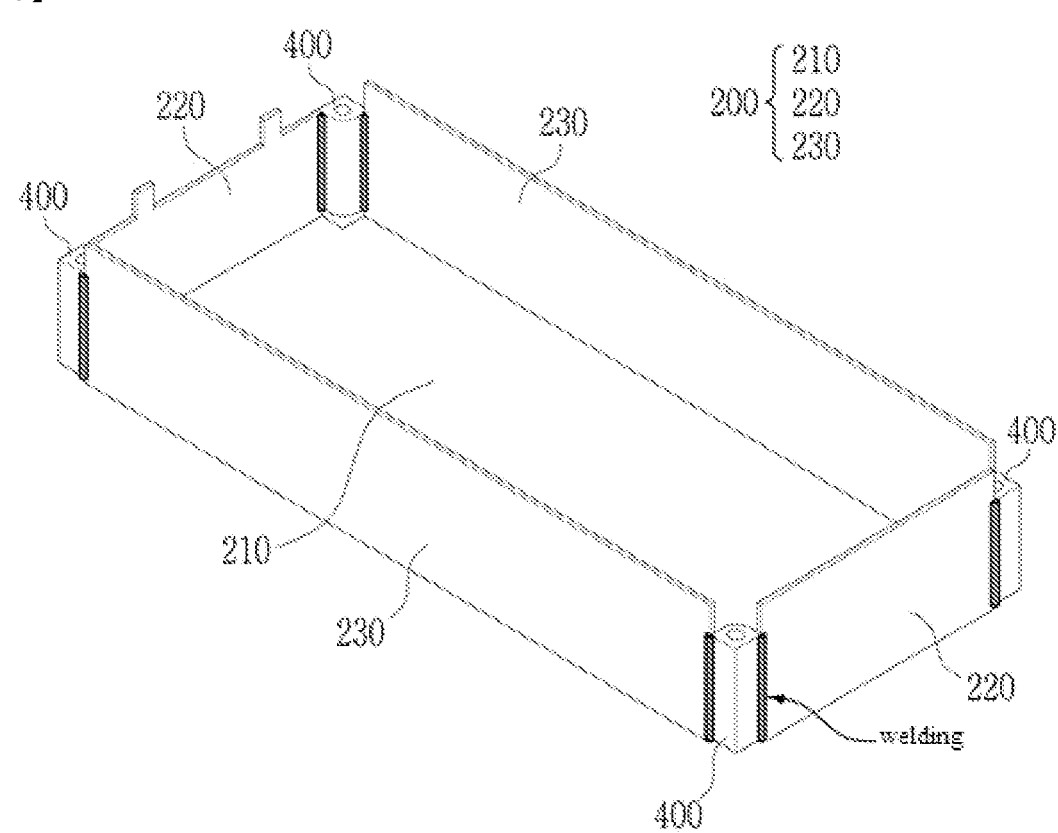

【FIG. 6】
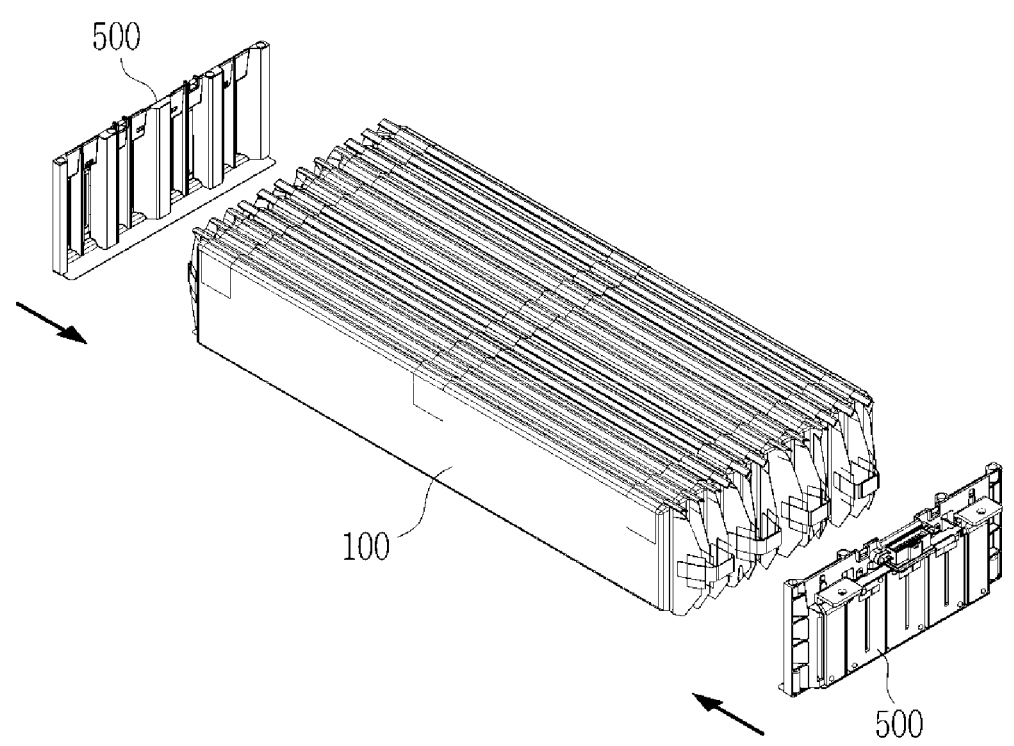

【FIG. 7】
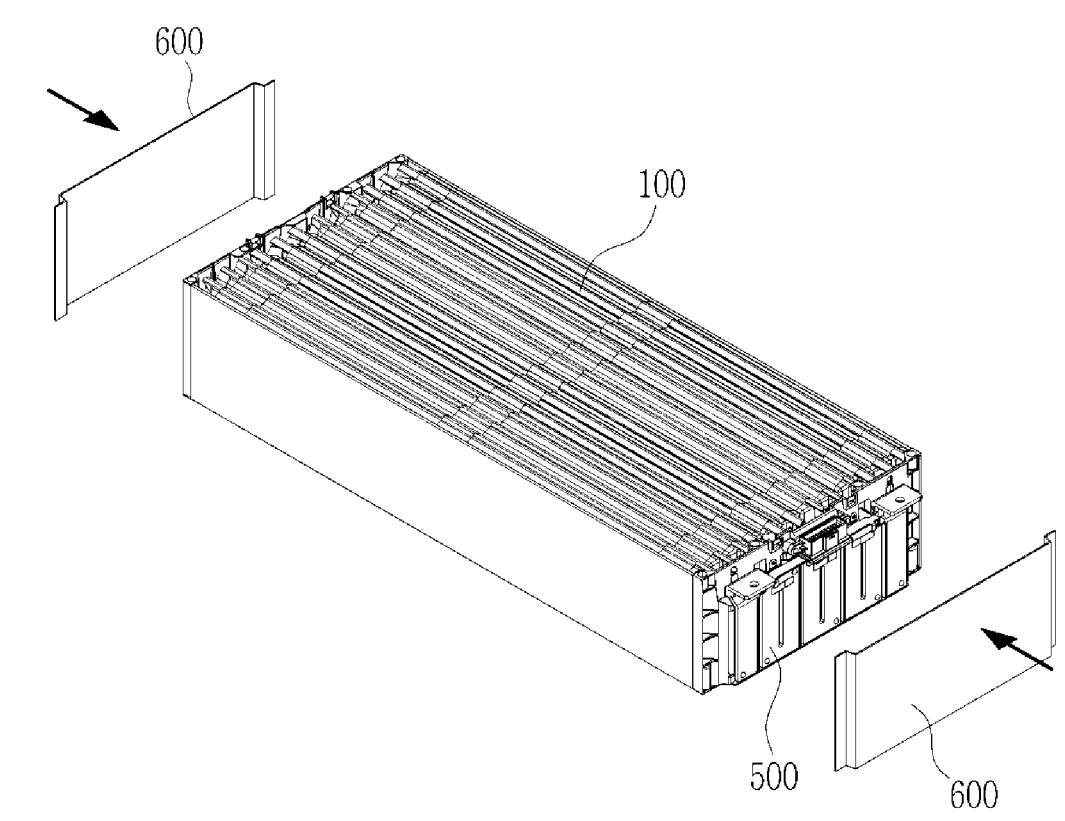

【FIG. 8】
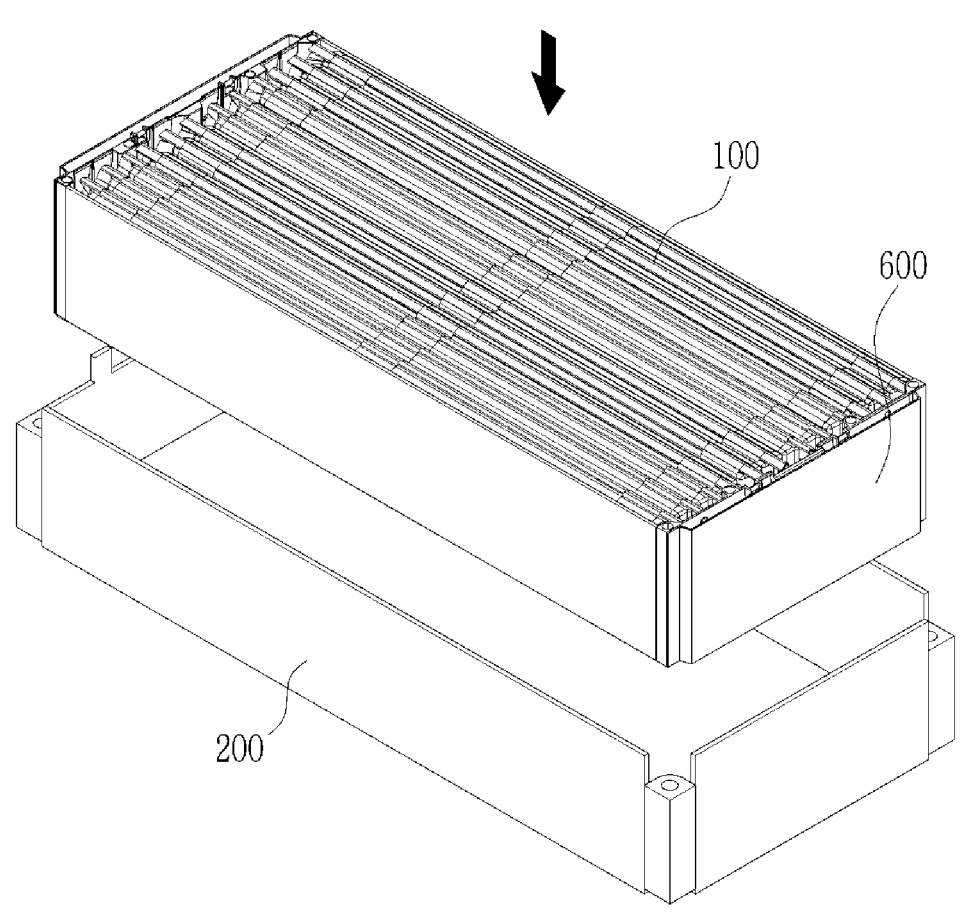

【FIG. 9】
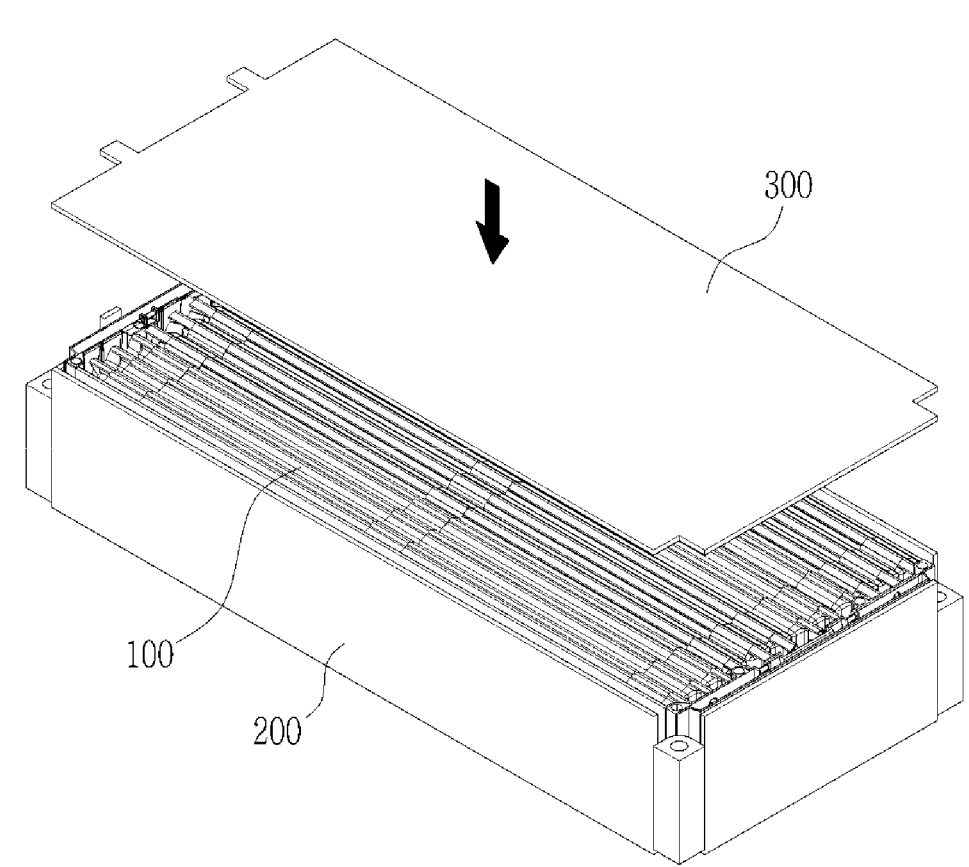

BATTERY MODULE AND BATTERY PACK INCLUDING THE SAME

CROSS-REFERENCE TO RELATED APPLICATIONS

The present application is a national stage entry under 35 U.S.C. § 371 of International Application No. PCT/KR2021/005905, filed on May 11, 2021, published in Korean, which claims priority from Korean Patent Application No. 10-2020-0060514, filed on May 20, 2020, the disclosures of which are incorporated herein by reference in their entireties.

TECHNICAL FIELD

Background Art

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

The battery module may include a battery cell stack in which a plurality of battery cells are stacked, and a module frame for housing the battery cell stack.

FIG. 1 is an exploded perspective view of a conventional battery module.

Referring to FIG. 1, the conventional battery module includes a battery cell stack 10 in which a plurality of battery cells are stacked, a module frame 20 for housing the battery cell stack 10, and an upper plate 30 for covering the upper surface of the battery cell stack 10, and end plates 40 for covering the front and rear surfaces of the battery cell stack 10.

The module frame 20 for housing the battery cell stack 10 was formed in the form of a U-shaped frame 20 on the bottom surface and both side surfaces to cover the bottom surface and both side surfaces of the battery cell stack, and the end plates 40 was formed so as to cover the front and rear surfaces of the battery cell stack by welding the end plate 40 to the front and rear edges of the U-shaped frame 20, as shown in FIG. 1.

At this time, the module mounting parts 41 formed on both sides of the end plate 40 are required to secure the battery module to the battery pack, and in order to easily express the shape of the module mounting part 41 on the end plate 40, the end plate 40 must be separately manufactured by a casting method, but the material of the end plate 40, which is a casting, is different from the U-shaped frame 20, which is a plate material, so that defects between dissimilar metals may occur during welding between the end plate 40 and the U-shaped frame 20.

DETAILED DESCRIPTION OF THE INVENTION

Technical Problem

It is an object of the present disclosure to provide a battery module having improved weldability, and a battery pack including the same.

The objects of the present disclosure are not limited to the aforementioned objects, and other objects which are not described herein should be clearly understood by those skilled in the art from the following detailed description.

Technical Solution

In order to achieve the above object, one embodiment of the present disclosure provides a battery module comprising: a battery cell stack in which a plurality of battery cells are stacked, a module frame that is formed into a bowl type of a bottom surface and front, rear, left and right surfaces and houses the battery cell stack; and an upper plate that covers the upper side of the battery cell stack and is coupled to the module frame, wherein the module frame comprises a bottom part, front and rear plates, and left and right plates, wherein the bottom part, the front and rear plates, and the left and right plates are integrally formed, and wherein a recessed part is formed at a portion where a bottom edge connected to the front and rear plates meet with a bottom edge connected to the left and right plates.

A module mounting part may be formed in the recessed part.

The module mounting part and the front, rear, left and right plates of the module frame may be coupled by welding.

The side edges of the front and rear plates and the side edges of the left and right plates may be formed so as to be separated from each other.

The side surface of the module mounting part, the front and rear plates and the left and right plates of the module frame may be formed so as to be connected to one surface.

Another embodiment of the present disclosure provides a method for manufacturing a battery module, the method comprising: a step of manufacturing a module frame formed of a bottom surface and front, rear, left and right surfaces separated from each other; a step of coupling a module mounting part between the front and rear plates and the left and right plates of the module frame; a step of weld-coupling the module mounting part and edges of the front and rear plates and the left and right plates of the module frame; and a step of inserting the battery cell stack into the module frame formed as a bowl-type case.

The method may further comprise a step of coupling a busbar frame to the front and rear surfaces of the battery cell stack, before the step of inserting the battery cell stack into the module frame.

The method may further comprise a step of coupling an insulating cover to the outside of the bus bar frame, after the step of coupling a busbar frame to the front and rear surfaces of the battery cell stack.

The method may further comprise a step of coupling the upper plate to the opened upper side part of the module frame, after the step of inserting the battery cell stack into the module frame.

The module frame may be included in a battery pack according to another embodiment of the present disclosure.

Advantageous Effects

A battery module and a battery pack including the same according to an embodiment of the present disclosure have a bowl-shaped module frame in which an end plate and a module frame are integrated, thereby capable of improving the weldability, simplifying the module structure, and reducing the weight of the battery module.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view of a conventional battery module;

FIG. 2 is an exploded perspective view of a battery module according to an embodiment of the present disclosure;

FIG. 3 is a perspective view showing the assembled state of the battery module of FIG. 2 together with a welding line;

FIG. 4 is a diagram showing a state in which the module mounting part is assembled to the module frame in accordance with an embodiment of the present disclosure;

FIG. 5 is a diagram showing a state in which the assembled module mounting part and module frame of FIG. 4 are coupled by welding;

FIG. 6 is a diagram showing a state in which a busbar frame is assembled to a battery cell stack in accordance with an embodiment of the present disclosure;

FIG. 7 is a diagram showing a state in which an insulating cover is assembled to the busbar frame of FIG. 6 in accordance with an embodiment of the present disclosure;

FIG. 8 is a diagram showing a state in which the battery cell stack of FIG. 7 is assembled to the module frame of FIG. 5; and FIG. 9 is a diagram showing a state in which the upper plate is assembled on the upper side part of FIG. 8.

DETAILED DESCRIPTION OF THE EMBODIMENTS

It should be appreciated that the exemplary embodiments, which will be described below, are illustratively described to assist in the understand the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Hereinafter, a battery module according to an embodiment of the present disclosure will be described with reference to FIGS. 2 to 4.

FIG. 2 is an exploded perspective view of a battery module according to an embodiment of the present disclosure. FIG. 3 is a perspective view showing the assembled state of the battery module of FIG. 2 together with a welding line. FIG. 4 is a diagram showing a state in which the module mounting part is assembled to the module frame in accordance with an embodiment of the present disclosure.

Referring to FIGS. 2 to 4, a battery module according to an embodiment of the present disclosure includes a battery cell stack 100 in which a plurality of battery cells are stacked, a module frame 200 that is formed into a bowl type of a bottom surface and front, rear, left and right surfaces and houses the battery cell stack 100, and an upper plate 300 that covers the upper side of the battery cell stack 100 and is coupled to the module frame 200.

The battery cell is a secondary battery, which may be configured as a pouch-type secondary battery. Such a battery cell may be composed of a plurality of cells, and the plurality of battery cells may be stacked together so as to be electrically connected to each other, thereby forming the battery cell stack 100. Each of the plurality of battery cells may include an electrode assembly, a cell case, and an electrode lead protruding at both ends from the electrode assembly.

The module frame 200 according to the embodiment of the present disclosure is formed into a bowl type of a bottom surface and front, rear, left and right surfaces. Conventionally, the frame structure was composed of a U-shaped frame that covers the bottom surface and both side surfaces of the battery cell stack and an end plate that covers the front and rear surfaces of the battery cell stack, but in order to form the module mounting part formed on both side ends of the end plate, the end plate was manufactured by a casting method, so that at the time of weld-coupling with the U-shaped frame, which is the material of the plate material, defects may occur due to the coupling between dissimilar materials.

Therefore, according to the embodiment of the present disclosure, the end plate was removed, and the battery cell stack 100 was housed through the bowl-shaped module frame 200 formed of a bottom surface and five surfaces of front, rear, left and right surfaces instead of the conventional U-shaped frame. It is not necessary to cast the entirety of the end plate through the structure of the module frame 200 in which the end plate and the U-shaped frame are integrated in this way, and only the module mounting part 400 described later can be separately manufactured through extrusion molding and then weld-coupled to the module frame 200, whereby the frame structure can be simplified, the weight of the battery module is reduced, and the weldability is improved.

According to the embodiment of the present disclosure, as shown in FIGS. 3 and 4, the module frame 200 includes a bottom part 210, front and rear plates 220, and left and right plates 230. The bottom part 210, the front and rear plates 220, and the left and right plates 230 are integrally formed, and a recessed part 240 is formed at a portion where the bottom edge connected to the front and rear plates 220 meets with the bottom edge connected to the left and right plates 230.

The bottom part 210, the front and rear plates 220, and the left and right plates 230 may form the bottom surface and the front, rear, left and right surfaces of the module frame 200. However, according to the embodiment of the disclosure, the side edges of the front and rear plates 220 and the side edges of the left and right plates 230 may be formed so as to be separated from each other. Referring to FIG. 4, a recessed part 240 may be formed at an edge portion where the plates meet. The module mounting part 400 may be formed in the recessed part 240.

The module mounting part 400 according to the embodiment of the present disclosure may be respectively located in a separation space between the front and rear plates 220 and the left and right plates 230 of the module frame 200. Referring to FIG. 3, the module mounting part 400 can be weld-coupled with the edge portions of the adjacent module frame 200, that is, the front and rear plates 220 and the left and right plates 230 of the module frame 200. At this time, the side surface of the module mounting part 400 and the front and rear surfaces and the side surfaces of the module frame 200 may be formed so as to be connected by one surface. Therefore, the module mounting part 400 is prevented from protruding from the frame surface of the module frame 200, so that damage to the protrusion part is minimized, the unit size management for each battery module is facilitated, and the mountability of the battery module to the battery pack can be improved.

The upper plate 300 may be formed so as to cover the opened upper side part of the module frame 200. The upper plate 300 may be coupled by welding to the upper edges of the module frame 200.

The busbar frame 500 may be formed so as to cover the front and rear surfaces of the battery cell stack 100. Busbars may be attached to the busbar frame 500 to electrically connect electrode leads which are formed in a plurality of battery cells.

Referring to FIG. 7, an insulating cover 600 may be attached between the front and rear surfaces of the busbar frame 500 and the module frame 200. The battery cell stack 100 and the busbar frame 500 can be interrupted from electrically connecting to the outside through the insulating cover, thereby securing the stability of the battery module.

Hereinafter, a method for manufacturing a battery module according to an embodiment of the present disclosure will be described with reference to FIGS. 3 to 9.

FIG. 5 is a diagram showing a state in which the assembled module mounting part and module frame of FIG. 4 are coupled by welding. FIG. 6 is a diagram showing a state in which a busbar frame is assembled to a battery cell stack in accordance with an embodiment of the present disclosure. FIG. 7 is a diagram showing a state in which an insulating cover is assembled to the busbar frame of FIG. 6 in accordance with an embodiment of the present disclosure. FIG. 8 is a diagram showing a state in which the battery cell stack of FIG. 7 is assembled to the module frame of FIG. 5; and FIG. 9 is a diagram showing a state in which the upper plate is assembled on the upper side part of FIG. 8.

Referring to FIGS. 3 to 9, the manufacturing method of the battery module according to the embodiment of the present disclosure includes a step of manufacturing a module frame 200 formed of a bottom surface and front, rear, left and right surfaces separated from each other, a step of coupling a module mounting part 400 between the front and rear plates 220 and the left and right plates 230 of the module frame 200 (FIG. 4), a step of weld-coupling the module mounting part 400 and edges of the front and rear plates 220 and the left and right plates 230 of the module frame, and a step of inserting the battery cell stack 100 into the module frame 200 formed as a bowl-type case.

According to the embodiment of the present disclosure, the method may further comprise a step of coupling a busbar frame 500 to the front and rear surfaces of the battery cell stack 100 (FIG. 6), before the step of inserting the battery cell stack 100 into the module frame 200. The method may further comprise a step of coupling an insulating cover 600 to the outside of the busbar frame 500 (FIG. 7), after the step of coupling a busbar frame 500 to the front and rear surfaces of the battery cell stack 100.

Further, according to the embodiment of the present disclosure, the method may further comprise a step of coupling the upper plate 300 to the opened upper side part of the module frame 200 (FIG. 9), after the step of inserting the battery cell stack 100 into the module frame 200.

Conventionally, there was an additional step of assembling the end plate into the U-shaped frame, but according to the embodiment of the present disclosure, the module frame can be manufactured only by coupling the extrusion-molded module mounting part 400 to the module frame, so that the assembly process of the battery module and the manufacturing process of the parts are simplified, the problem of poor coupling due to dissimilar materials between the end plate and the module frame is eliminated, and the weldability of the battery module can be improved as a whole.

The above-mentioned battery module can be included in the battery pack. The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: battery cell stack
200: module frame
210: bottom part (bottom surface)
220: front and rear plates
230: left and right plates
240: recessed part
300: upper plate
400: module mounting part
500: busbar frame
600: insulating cover

The invention claimed is:

1. A battery module comprising:

a battery cell stack in which a plurality of battery cells are stacked;

a module frame that is formed into a bowl shape having a bottom part and front, rear, left, and right plates, the module frame housing the battery cell stack therein, the bottom part and the front, rear, left, and right plates being portions of a single unitary plate that are integrally formed; and an upper plate that covers the upper side of the battery cell stack and is coupled to the module frame, wherein recessed parts are formed by the module frame at portions where side edges of the front and rear plates confront corresponding side edges of the left and right plates, and wherein a module mounting part is disposed in each of the recessed parts, sidewalls of each module mounting part forming part of an outside surface of the module frame, the module mounting parts being configured to secure the battery module to a battery pack, the module mounting parts each having an opening extending therein that is not covered by the upper plate.

2. The battery module of claim 1, wherein the module mounting parts and respective adjacent ones of the front, rear, left, and right plates of the module frame are coupled to one another by welding.

3. The battery module of claim 1, wherein the side edges of the front and rear plates and the corresponding side edges of the left and right plates are spaced apart from each other.

4. The battery module of claim 1, wherein side surfaces of the module mounting parts, the front and rear plates, and the left and right plates of the module frame together form one continuous surface.

5. A battery pack comprising the battery module of claim 1.

6. A method for manufacturing a battery module, the method comprising:

manufacturing a module frame integrally formed of a bottom part and front, rear, left, and right plates that are portions of a single unitary plate, side edges of the front and rear plates and corresponding side edges of the left and right plates being spaced apart from each other, the module frame being bent into a bowl shape;

weld-coupling module mounting parts between the side edges of the front and rear plates and the corresponding side edges of the left and right plates of the module frame, such that sidewalls of each module mounting part forms part of an outside surface of the module frame, the module mounting parts being configured to secure the battery module to a battery pack;

inserting a battery cell stack into the module frame; and coupling an upper plate to an upper opening of the module frame, wherein the module mounting parts each have an opening extending therein that is not covered by the upper plate.

7. The method of claim 6, further comprising coupling a busbar frame to front and rear surfaces of the battery cell stack, before the inserting of the battery cell stack into the module frame.

8. The method of claim 7, further comprising coupling an insulating cover to an outside of the busbar frame, after the coupling of the busbar frame to the front and rear surfaces of the battery cell stack.

9. The method of claim 6, wherein the coupling of the upper plate to the upper opening of the module frame, is performed after inserting the battery cell stack into the module frame.

* * * * *